Jan. 6, 1970 E. O. SCHONSTEDT 3,488,579
MAGNETIC GRADIOMETER APPARATUS WITH
MISALIGNMENT COMPENSATION
Original Filed Jan. 12, 1966 2 Sheets-Sheet 1

INVENTOR
ERICK O. SCHONSTEDT

BY *Smaller...*

ATTORNEY

Jan. 6, 1970   E. O. SCHONSTEDT   3,488,579
MAGNETIC GRADIOMETER APPARATUS WITH
MISALIGNMENT COMPENSATION
Original Filed Jan. 12, 1966   2 Sheets-Sheet 2

INVENTOR
ERICK O. SCHONSTEDT

BY *[signature]*

ATTORNEY

United States Patent Office 3,488,579
Patented Jan. 6, 1970

3,488,579
MAGNETIC GRADIOMETER APPARATUS WITH MISALIGNMENT COMPENSATION
Erick O. Schonstedt, Silver Spring, Md.
(1604 Greenbrier Court, Reston, Va. 22070)
Continuation of application Ser. No. 520,105, Jan. 12, 1966. This application Apr. 1, 1969, Ser. No. 812,456
Int. Cl. G01v 33/02
U.S. Cl. 324—43                                    4 Claims

ABSTRACT OF THE DISCLOSURE

Magnetic gradiometer having a pair of main directional magnetic field sensors provided with means for applying excitation oscillations thereto and for deriving a differential output therefrom and having a pair of additional directional magnetic field sensors similarly provided with means for applying excitation oscillations thereto and means for deriving outputs therefrom, the additional sensors being employed to compensate for misalignment of the axes of the main sensors. The main sensors are firmly attached to a rigid non-magnetic support with their individual axes approximately parallel with a predetermined axis, and the additional sensors are rigidly mounted with respect to the support with their magnetic axes perpendicular to each other and to the said predetermined axis. The rectified outputs of the additional sensors are adjusted in phase and amplitude and applied to neutralizing coils coupled to the main sensors.

---

Figure 1:
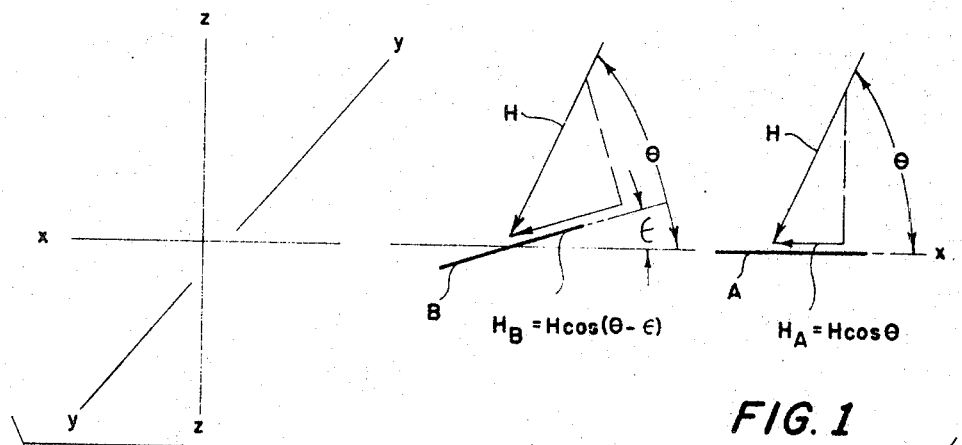

This is a continuation of application Ser. No. 520,105, filed Jan. 12, 1966.

This invention relates to apparatus for measuring or sensing magnetic fields and more particularly to a magnetic gradiometer incorporating electrical compensation for misalignment of the magnetic field sensing elements.

Saturable core (or fluxgate) magnetic gradiometers are comprised of at least two electrically matched field sensing elements that are mounted on a non-magnetic structure such that their magnetic axes are, theoretically, precisely parallel. The output signals of the two sensors are arranged such that they oppose each other. If the structure is oriented in any direction in a uniform magnetic field, the components of magnetic field existing at each sensor are equal, so that there is no resulting output signal from the combination of the two sensors.

If a magnetic object exists within the detection range of the instrument, the magnetic field will generally be stronger at one of the sensors than at the other sensor. As a result, the output signal of one sensor will be greater than that of the other, so a net difference signal will be produced that is indicative of the presence of the object.

For accuracy of operation the magnetic axes of the two sensors must be precisely aligned parallel. The precision required is of the order of three seconds of arc if the error signal due to misalignment of the magnetic axes is to be less than one gamma ($10^{-5}$ gauss) in an ambient magnetic field of 60,000 gammas. If the magnetic axes of the two sensors are not precisely parallel, the component of the ambient uniform magnetic field existing along the magnetic axis of one sensor will not be the same as the component of magnetic field existing along the magnetic axis of the other sensor. The difference between the two sensor signals will not be zero, so that a false signal can be obtained due to this mechanical misalignment.

In conventional fluxgate gradiometers mechanical means have been used to achieve the critical sensor alignment. Typically the sensors have been mounted in a pipe or tube and the tube bent slightly as required to achieve the sensor alignment. See, for example, the applicant's prior Patent No. 3,050,679, issued Aug. 21, 1962. The bending of the tube places the tube under stress. In time, the stress may be relieved and the sensors may become misaligned, resulting in inaccuracy.

A primary object of the present invention is to provide magnetic field sensing apparatus in which equality of sensor output in a uniform field is achieved without mechanical stressing or mechanical adjustment of the structure on which the sensors are mounted.

More specifically, it is an object of the invention to provide electrical compensation for inequality of magnetic sensor output due to misalignment of the sensor magnetic axes.

Briefly stated, but without intent to limit the scope of the invention, in accordance with the invention the gradient-measuring sensors are located on any suitable rigid, stress-relieved structure with their magnetic axes initially aligned within one to five minutes of arc of parallelism. The sensors are rigidly attached to the supporting structure in a manner which minimizes stressing that structure. Remaining misalignment is corrected electrically.

Figure 3:
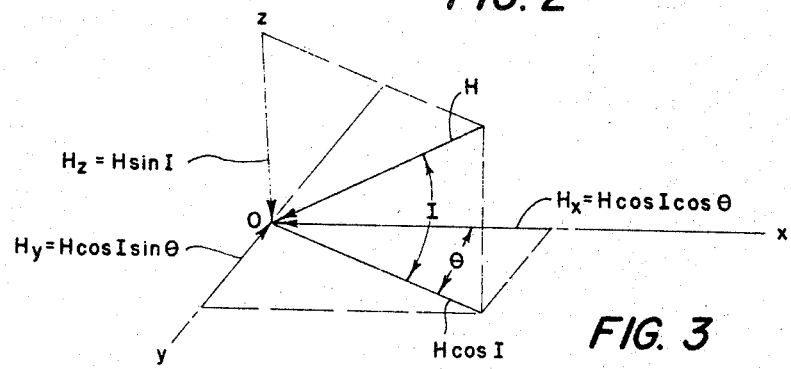
Figure 4:
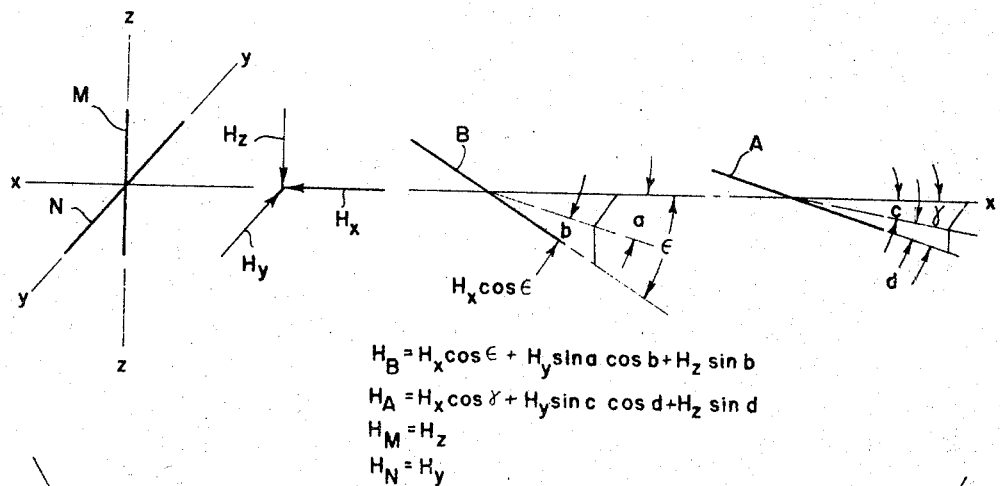
Figure 5:
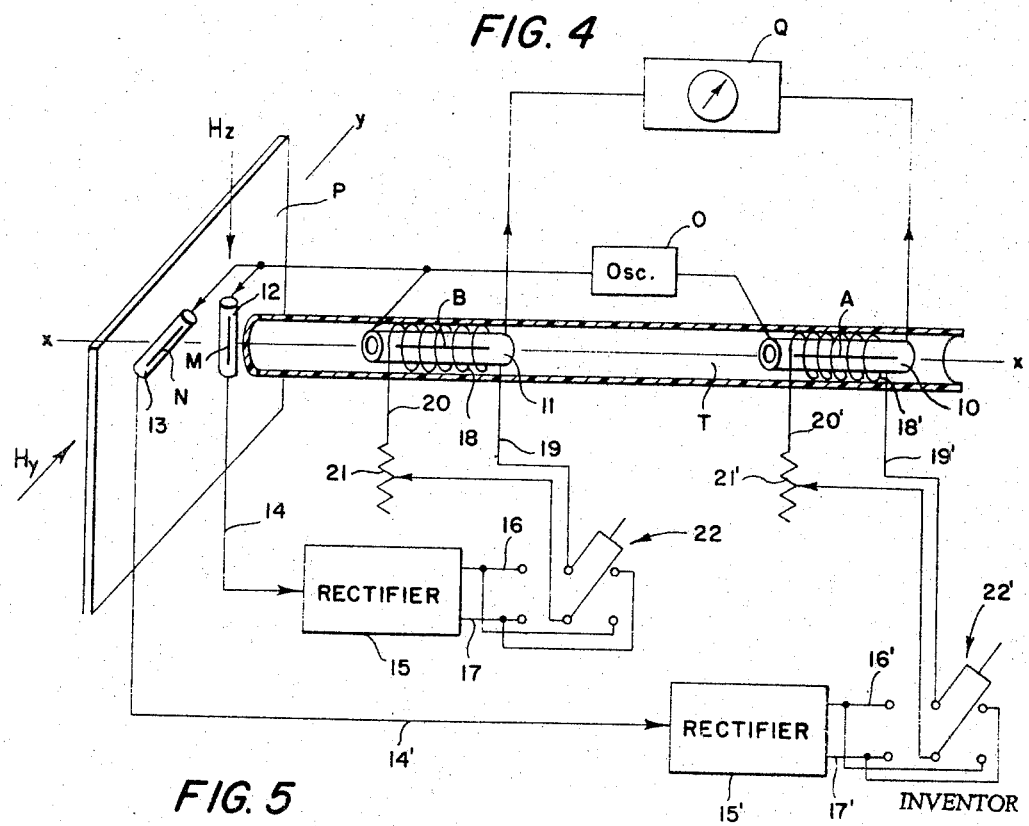

The foregoing and other objects, advantages and features of the invention, and the manner in which the same are accomplished will become more readily apparent upon consideration of the following detailed description of the invention taken in conjunction with the accompanying drawings, wherein:

FIGURES 1–4 are mathematical diagrams illustrating the principle of the invention; and FIGURE 5 is a partially schematic diagram illustrating a preferred and exemplary embodiment of the invention.

Before the details of the structure of the invention are set forth, the mathematics of the problem will be considered.

Referring to FIGURE 1, A represents the magnetic axis of one directional sensor and B the magnetic axis of a second directional sensor. Axis A is precisely parallel (a term intended to include coaxial) with line X—X and B makes a slight angle $\epsilon$ with line X—X.

Magnetic field vector H is directed at an angle $\theta$ with respect to line X—X.

As an initial simplification of the mathematics, it will be assumed the angle $\epsilon$ and vector H are confined to the X–Z plane.

The component of magnetic field $H_A$ acting on axis A will be $$H_A = H \cos \theta$$

The component of magnetic field $H_B$ acting on axis B will be $$H_B = H \cos (\theta - \epsilon)$$

which can be expressed as $$H_B = H \cos \theta \cos \epsilon + H \sin \theta \sin \epsilon$$

If it is assumed that $\epsilon$ is a small angle, on the order of a few minutes of arc, for practical purposes $\cos \epsilon = 1.0000$ so that the equation for $H_B$ may be rewritten as $$H_B = H \cos \theta + H \sin \theta \sin \epsilon$$

The difference $H_\epsilon$ in the components of magnetic field acting on A and B will be $$H_\epsilon = H_B - H_A = H \cos \theta + H \sin \theta \sin \epsilon$$
$$- H \cos \theta = H \sin \theta \sin \epsilon$$

In view of angle $\epsilon$, the magnetic gradiometer system will produce an error signal proportional to $$H_\epsilon = H \sin \theta \sin \epsilon$$

The purpose of this invention is to eliminate this error signal, as will be explained in connection with the diagram of FIGURE 2.

Figure 2:
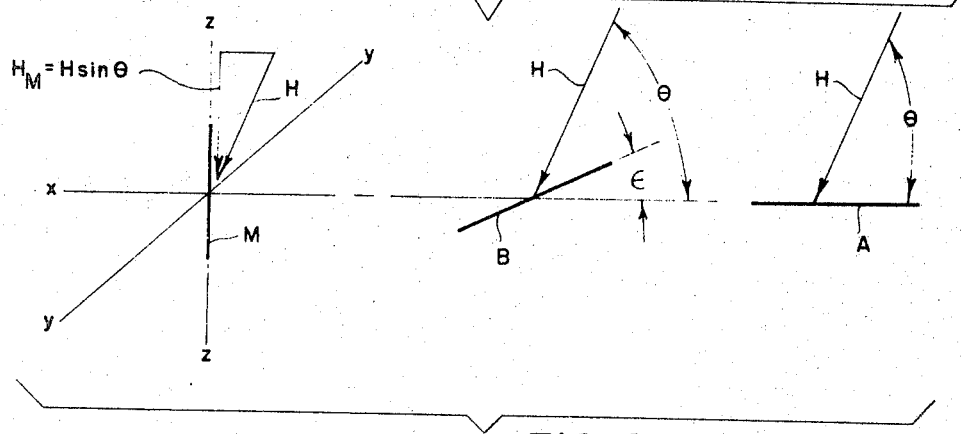

The situation of FIGURE 2 is identical to that of FIGURE 1 with the exception that a directional sensor whose axis is M is disposed perpendicular to line X—X and lies in the X–Z plane.

The magnetic field component $H_M$ acting along M is given by $H_M = H \sin \theta$.

$H_M$ is identical with $H_\epsilon$ except for the multiplying factor $\sin \epsilon$ which appears in the equation $H_\epsilon = H \sin \theta \sin \epsilon$.

The sensor having axis M is a part of a compensating magnetometer system which generates signals proportional to $H \sin \theta$. The output signal of the magnetometer can be employed to compensate for or eliminate the effect of $H_\epsilon$.

As will later appear, one method of acomplishing this is to employ a solenoid around axis B through which a direct current generated by the compensating magnetometer is passed. This direct current is adjusted such that the magnetic field at axis B produced by this current is equal to $-H_\epsilon = -H \sin \theta \sin \epsilon$.

As will later appear, a similar arrangement for correcting angular misalignments of the sensor having axis A can be provided with the addition of another sensor perpendicular to axis M and axis X—X.

The foregoing presentation is an over simplification of the mathematics involved. A more complete presentation will be made with the aid of FIGURES 3 and 4.

Referring to FIG. 3, a rectangular coordinate system is illustrated in which magnetic field vector H is at an angle I with respect to the X–Y plane. The projection, $H \cos I$, on the X–Y plane is at an angle $\theta$ with respect to the X coordinate.

The rectangular components of field H with respect to the coordinate system will be $H_X = H \cos I \cos \theta$ parallel with O–Y
$H_Y = H \cos I \sin \theta$ parallel with O–Y
$H_Z = H \sin I$ parallel with O–Z These components will be employed in connection with FIGURE 4.

Referring to FIGURE 4, axis M of a directional magnetic sensor is parallel with axis Z—Z; axis N of another such sensor is parallel with axis Y—Y; axis A is displaced from axis X—X by angle $\gamma$; and axis B is displaced from axis X—X by angle $\epsilon$. The X, Y, and Z components of a magnetic field vector H (e.g., the Earth's magnetic field) are shown at $H_X$, $H_Y$, $H_Z$ parallel to X—X, Y—Y and Z—Z respectively. These components are assumed to exist uniformly over the entire volume illustrated in FIGURE 4.

Axis B is disposed at an angle $\epsilon$ with respect to axis X—X. The projection of axis B in the X–Y plane makes an angle $a$ with respect to X—X. Axis B makes an angle $b$ with respect to X–Y plane.

Similarly, axis A is at an angle $\gamma$ with respect to X—X; the projection of axis A on the X–Y plane is at an angle $c$ with respect to X—X; and axis A is at an angle $d$ with respect to the X–Y plane.

The component $H_B$ obtained by the projection onto axis B of $H_X$, $H_Y$ and $H_Z$ is given by $H_B = H_X \cos \epsilon + H_Y \sin a \cos b + H_Z \sin b$ The component $H_A$ obtained by the projection onto axis A of components $H_X$, $H_Y$ and $H_Z$ is given by $H_A = H_X \cos \gamma + H_Y \sin c \cos d + H_Z \sin d$ The difference $H_E$ between the field components acting along B and along A can be obtained from the expression $H_E = H_B - H_A = H_X(\cos \epsilon - \cos \gamma) +$
$H_Y(\sin a \cos b - \sin c \cos d) + H_Z(\sin b - \sin d)$ All of the angles involved are very small, so the cosines of the angles can be considered, for practical purposes, to be equal to unity and positive. The sines of the angles may be either positive or negative depending upon the direction in which they are formed. Assuming the cosines to be unity, for practical purposes the expression for $H_E$ may be written $H_E = H_Y(\sin a - \sin c) + H_Z(\sin b - \sin d)$ As illustrated in FIGURE 4, the component of magnetic field along axis M is $H_Z$ and along axis N is $H_Y$.

The signal output from the magnetometer whose magnetic axis is N can be employed to compensate for the portion of the error field $H_E$ due to $H_Y(\sin a - \sin c)$. Similarly the output signal from the magnetometer whose magnetic axis is M can be employed to compensate for the portion of the error field $H_E$ due to $H_Z(\sin b - \sin d)$.

Referring back to FIGURE 3, component $H_Y$ is a function of the magnetic field intensity H and the directional angles $\theta$ and I. Component $H_Z$ is a function of intensity H and angle I. Hence, the system provides for automatic correction irrespective of the intensity and direction of the ambient field H.

A diagrammatic representation of one form of the invention is illustrated in FIGURE 5.

Referring to FIGURE 5, axes A, B, M, and N are respectively the magnetic axes of directional magnetic field sensors 10, 11, 12 and 13. Sensors 10 and 11 are the magnetic-gradient-measuring sensors and sensors 12 and 13 are the alignment sensors.

Sensors 10 and 11 are spaced along coordinate axis X—X and may be mounted upon a non-magnetic tube T or other suitable rigid supporting structure, as by means of a suitable cement that places minimum stress on the supporting structure. Similarly, sensors 12 and 13 may be cemented to a non-magnetic plate P rigidly attached to the end of tube T perpendicular to axis X—X. The axes A and B are aligned with axis X—X to within one to five minutes of arc of parallelism (or coaxiality), and axes M and N are as nearly perpendicular to each other and to axis X—X as practical. An orthogonality error of M and N of one-quarter degree or less is acceptable.

The sensors may be of the fluxgate type disclosed in the applicant's prior Patent No. 2,981,885, issued Apr. 25, 1961, or may be any other appropriate type. The details of the sensors are not part of the present invention, but for illustrative purposes it may be assumed that each sensor has a tubular core of permeable magnetic material with an excitation winding wound longitudinally through the core and a signal pick-up winding wound circumferentially around the core. The excitation windings (not shown) are supplied with alternating current by an oscillator O. Second harmonic fluxes generated in the cores due to the effect of an external magnetic field acting along the core axes cut the pick-up windings (not shown) and generate second harmonic output voltages therein. The output voltages from sensors 10 and 11 are applied differentially to suitable measuring apparatus Q, such as an AC voltmeter, so that if sensors 10 and 11 are matched and the axes A and B are perfectly aligned, the meter will read zero in a uniform field.

Sensor 12 will produce a suitable signal which is proportional in magnitude to the intensity of field $H_Z$ acting along its magnetic axis M. The phase of this signal is dependent on the direction of $H_Z$. The signal is transmitted to electronic unit 15 via conductors in cable 14. Electronic unit 15 includes a rectifier and produces a direct-current output on leads 16 and 17 that is proportional to the intensity of $H_Z$. The polarity of the direct-current output will depend upon the direction of $H_Z$. This direct-current output is transmitted to a neutralizing coil 18 wound about the core of sensor 11 circumferentially and having opposite leads 19 and 20 connected to unit 15 via reversing switch 22 and variable resistor 21.

The direct current flowing through coil 18 will produce a magnetic field parallel with axis B of sensor 11. The direction of the magnetic field will be directly related to the direction of field component $H_Z$. The initial polarity relationship between the magnetic field in coil 18 and the direction of component $H_Z$ is determined by the direction in which reversing switch 22 is thrown. The magnitude relationship between field $H_Z$ and the field in coil 18 is determined by an attenuator in the output circuit of electronic unit 15. This attenuator is represented by variable resistor 21. By this means, the field produced parallel to axis B can be made equal in intensity but oppositely directed to component $H_Z(\sin b - \sin d)$.

A similar arrangement involving axis A and axis N (and designated by primed reference characters) is illustrated in FIGURE 5 for producing in coil 18' surrounding sensor 10 a magnetic field equal in intensity but oppositely directed to component $H_Y(\sin a - \sin c)$.

Thus the arrangement including sensor M compensates for misalignment of axes A and B in the X–Z plane, and the arrangement including sensor N compensates for misalignment of axes A and B in the X–Y plane. The instrument may readily be adjusted, by means of resistors 21 and 21', so that meter Q reads zero when the sensors are in a uniform field, regardless of field intensity or direction.

While a preferred embodiment of the invention has been shown and described, it will be apparent to those skilled in the art that changes can be made without departing from the principles and spirit of the invention, the scope of which is defined in the appended claims. For example, the alignment error signal outputs from sensors 10 and 11 can be allowed to occur and the signal outputs of the magnetometers 12 and 13 applied to the circuits which process the outputs from 12 and 13 to eliminate the error signals. Accordingly, the foregoing embodiment is to be considered illustrative, rather than restrictive, and those modifications which come within the meaning and range of equivalents of the claims are to be included therein.

The invention claimed is:

1. A fluxgate gradiometer comprising a pair of main fluxgate directional magnetic field sensors located in spaced relationship and having their individual axes approximately parallel with a predetermined axis, said sensors being firmly attached to a rigid non-magnetic support and having means for applying core-saturating excitation oscillations thereto and means for deriving a differential output therefrom, neutralizing coil means coupled to said sensors for producing magnetic fields to which the sensors respond, a pair of additional fluxgate directional magnetic field sensors having magnetic axes perpendicular to each other and to the said predetermined axis and rigidly mounted with respect to said support, said additional sensors having means for applying core-saturating excitation oscillations thereto and means for deriving outputs therefrom, and means for producing direct currents in said neutralizing coil means in response to the outputs of said additional sensors for providing compensating magnetic fields at the main sensors proportional to the difference in magnetic field along the axis of said main sensors when said main sensors are in a uniform magnetic field.

2. The gradiometer of claim 1, said neutralizing coil means being wound about said main sensors.

3. The gradiometer of claim 1, said direct current producing means comprising rectifier means, polarity reversing means, and attenuator means connected in circuit with said neutralizing coil means and said additional sensors.

4. The gradiometer of claim 1, said neutralizing coil means comprising a pair of coils would about said main sensors, respectively, and receiving the rectified outputs of said additional sensors, respectively.

References Cited

UNITED STATES PATENTS

| | | | |
|---|---|---|---|
| 2,743,415 | 4/1956 | Williams et al. | 324—43 |
| 2,834,939 | 5/1958 | Tolles | 324—43 |
| 2,966,853 | 1/1961 | Gilfillan et al. | 324—43 |

RUDOLPH V. ROLINEC, Primary Examiner

R. J. CORCORAN, Assistant Examiner